(12) United States Patent
Ito et al.

(10) Patent No.: US 7,242,657 B2
(45) Date of Patent: Jul. 10, 2007

(54) PHASE CHANGE TYPE OPTICAL RECORDING MEDIUM AND RECORDING METHOD THEREFOR

(75) Inventors: Kazunori Ito, Kanagawa (JP); Makoto Harigaya, Kanagawa (JP); Masaru Shinkai, Kanagawa (JP); Hiroko Ohkura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 594 days.

(21) Appl. No.: 10/730,026

(22) Filed: Dec. 9, 2003

(65) Prior Publication Data

US 2004/0136307 A1    Jul. 15, 2004

(30) Foreign Application Priority Data

Dec. 27, 2002  (JP) ............................. 2002-380665

(51) Int. Cl.
*G11B 7/00* (2006.01)
(52) U.S. Cl. .................................. 369/59.11
(58) Field of Classification Search ............. 369/59.11, 369/59.12, 47.1, 59.1, 44.23, 44.24
See application file for complete search history.

(56) References Cited

U.S. PATENT DOCUMENTS

| | | | |
|---|---|---|---|
| 4,818,666 A | 4/1989 | Gravesteijn et al. | |
| 4,947,372 A | 8/1990 | Koshino et al. | |
| 5,732,062 A | 3/1998 | Yokoi et al. | |
| 5,875,160 A | 2/1999 | Harigaya et al. | |
| 6,096,398 A | 8/2000 | Yuzurihara et al. | |
| 6,177,167 B1 | 1/2001 | Yuzurihara et al. | |
| 6,256,277 B1 | 7/2001 | Saga et al. | |
| 6,391,417 B1 | 5/2002 | Yuzurihara et al. | |
| 6,426,936 B1 | 7/2002 | Shinotsuka et al. | |
| 6,479,121 B1 | 11/2002 | Miura et al. | |
| 6,548,137 B2 | 4/2003 | Ito et al. | |
| 2001/0041240 A1 | 11/2001 | Ito et al. | |
| 2002/0021643 A1 | 2/2002 | Miura et al. | |
| 2002/0098445 A1 | 7/2002 | Harigaya et al. | |
| 2002/0110063 A1 | 8/2002 | Yamada et al. | |
| 2002/0145963 A1 | 10/2002 | Narumi et al. | |
| 2002/0155248 A1 | 10/2002 | Ito et al. | |
| 2002/0160306 A1 | 10/2002 | Hanaoka et al. | |

(Continued)

FOREIGN PATENT DOCUMENTS

EP    1 182 649 A    2/2002

(Continued)

*Primary Examiner*—Nabil Hindi
(74) *Attorney, Agent, or Firm*—Dickstein Shapiro LLP

(57) ABSTRACT

A recording method forms recording marks according to a mark length modulation by irradiating a pulse-shaped light beam with respect to a crystallized phase change recording layer of a phase change type optical recording medium which comprises at least the phase change recording layer and a reflection layer on a substrate. The recording method irradiates a light beam formed by a single recording pulse when forming a recording mark having a size less than or equal to a predetermined size N, where the predetermined size N is set with reference to a reference size which is sum of a beam spot diameter of the light beam and a distance traveled by the light beam within a time amounting to a sum of rising and falling time constants of a light beam power, and irradiates a light beam formed by a plurality of recording pulses when forming a recording mark having a size greater than the predetermined size N.

13 Claims, 6 Drawing Sheets

U.S. PATENT DOCUMENTS

| | | |
|---|---|---|
| 2002/0163876 A1 | 11/2002 | Shinotsuka et al. |
| 2003/0003395 A1 | 1/2003 | Yuzurihara et al. |
| 2003/0012917 A1 | 1/2003 | Harigaya et al. |
| 2003/0124298 A1 | 7/2003 | Ito et al. |
| 2003/0143365 A1 | 7/2003 | Ito et al. |
| 2003/0152006 A1 | 8/2003 | Ohkura et al. |
| 2003/0180495 A1 | 9/2003 | Ito et al. |
| 2004/0037203 A1 | 2/2004 | Harigaya et al. |

FOREIGN PATENT DOCUMENTS

| | | |
|---|---|---|
| EP | 1 193 696 A2 | 4/2002 |
| EP | 1 249 834 A | 10/2002 |
| EP | 1 372 148 | 12/2003 |
| JP | 63/160017 | 7/1988 |
| JP | 2001-331936 | 11/2001 |
| JP | 2002-096560 | 2/2002 |
| JP | 2003/085752 | 3/2003 |
| JP | 2003231354 | 8/2003 |
| JP | 2003242646 | 8/2003 |
| WO | WO 02/084657 A1 | 10/2002 |
| WO | WO 2004/021341 A1 | 3/2004 |

PHASE CHANGE TYPE OPTICAL RECORDING MEDIUM AND RECORDING METHOD THEREFOR

BACKGROUND OF THE INVENTION

This application claims the benefit of a Japanese Patent Application No. 2002-380665 filed Dec. 27, 2002, in the Japanese Patent Office, the disclosure of which is hereby incorporated by reference.

1. Field of the Invention

The present invention generally relates to optical recording media and recording methods therefor, and more particularly to a so-called rewritable phase change type (or phase transition type) optical recording medium which may be used to record information thereon and reproduce information therefrom by irradiating a light beam to cause an optical change (or transition) in a recording layer material thereof, and to a recording method suited for recording information on such a phase change type optical recording medium at a high speed.

2. Description of the Related Art

Recently, recording speeds for phase change type optical recording media such as CD-RW, DVD+RW and DVD-RW have improved, and high-speed recording systems are being developed to realize a 24-times speed recording in the case of the CD-RW and to realize a 2-times to 4-times speed recording in the case of the DVD. With respect to a rewritable phase change type optical recording medium employing the DVD format, there are active research and development to realize an optical recording system aimed at recording information at even higher recording speeds.

Formats of conventional recording strategies usually set a basic (or fundamental) period to 1T, where T denotes a channel period. The "channel" indicates a time or spatial length per data bit, and is standardized for the DVD, for example. But as the recording speed increases and the recording is made by setting a recording pulse width of a light beam to be the same as the conventional channel period, there was a problem in that it is impossible to obtain a sufficiently high power when recording an amorphous mark. In order to solve this problem, a Japanese Laid-Open Patent Application No. 2001-331936 proposed a method of setting the recording strategy such that the basic period is 2T.

In other words, according to the setting of the conventional recording strategy, the number of recording pulses of the light beam is set to n-1 or b-2 when a length of the recording mark is denoted by nT. For this reason, the recording is prescribed such that the number of recording pulses is increased every time the length of the recording mark increases by 1T. In the case of the recording strategy employing the basic period of 2T, the number of recording pulses increased every time the length of the recording mark increases by 2T, so as to reduce the increase in the number of recording pulses and reduce jitter even in the case of a high-speed recording.

However, the recording strategy employing the basic period of 2T does not sufficiently take into consideration a relationship between a rise and fall characteristic of a light beam power of a recording apparatus used for the recording. For this reason, the recording strategy employing the basic period of 2T is not always satisfactory, and there was a problem in that the setting of the recording pulses is not always appropriate.

For example, the above described method proposed in the Japanese Laid-Open Patent Application No. 2001-331936 can be applied to a high-speed recording such as the 4-times speed or higher in the case of the rewritable-DVD. But according to experiments conducted by the present inventors, it was found desirable that an application limit of the above described method is on the order of 6-times speed of a reference recording speed (1-times speed: 3.49 m/sec) of the DVD.

In addition, when forming the recording mark by the conventional recording method at a higher speed, such as at a 10-times speed of the recording speed of the DVD, the pulse width needs to be set to approximately 1.9 nsec if a duty ratio is set to 0.5 when forming the recording mark, as shown in FIG. 1. FIG. 1 is a diagram showing the recording pulses used by the conventional recording method. In FIG. 1 and FIGS. 2 and 3 which will be described later, the ordinate indicates the recording pulse amplitude (or power level), and the abscissa indicates the time. In FIG. 1, Pw denotes a recording (write) power, Pe denotes an erasing power, Pb denotes a bottom power, and W denotes the width of the recording pulse.

On the other hand, rising and falling time constants of the recording pulses which can be formed by direct modulation of an existing semiconductor laser diode (LD) are approximately 2 nsec, as shown in FIG. 2. FIG. 2 is a diagram showing rising and falling edges of the recording pulses which can be formed by direct modulation of the existing semiconductor laser diode (LD). Hence, it is impossible to emit a light beam having the required recording power Pw (or power level) within an irradiation time. In FIG. 2, Pr denotes a rising edge of the recording pulse, and Pf denotes a falling edge of the recording pulse.

For example, even when carrying out a 10-times speed recording according to the recording strategy which employs the basic period of 2T, the actual recording pulse width having the duty ratio of 0.5 is 3.8 nsec, and although such a recording pulse can be formed, the half breadth becomes extremely narrow as shown in FIG. 3. FIG. 3 is a diagram showing the half breadth of the actual recording pulses used by the conventional recording method. Consequently, it may be easily seen from FIG. 3 that it is difficult to obtain a sufficiently high power for forming the amorphous mark. In FIG. 3, Phb denotes the half breadth of the recording pulse.

Therefore, there are demands to realize a further improved recording strategy which can cope with the high-speed recording, such as the recording speed on the order of the 6-times speed or higher in the case of the DVD, and is capable of obtaining a sufficiently high power when forming the amorphous mark even when the recording speed increases.

SUMMARY OF THE INVENTION

Accordingly, it is a general object of the present invention to provide a novel and useful phase change type optical recording medium and recording method therefor, in which the problems described above are eliminated.

Another and more specific object of the present invention is to provide a phase change type optical recording medium and a recording method therefor, which can set a recording strategy capable of obtaining a sufficiently high power for a pulse-shaped light beam which is irradiated on the optical recording medium when forming amorphous recording marks at a high speed, and can even cope with a recording speed on the order of 6-times speed or higher in the case of a DVD, to realize satisfactory recording characteristics such as modulation factor and jitter.

Still another and more specific object of the present invention is to provide a recording method for forming recording marks according to a mark length modulation by irradiating a pulse-shaped light beam with respect to a crystallized phase change recording layer of a phase change type optical recording medium which comprises at least the phase change recording layer and a reflection layer on a substrate, the recording method comprising irradiating a light beam formed by a single recording pulse when forming a recording mark having a size less than or equal to a predetermined size N, the predetermined size N being set with reference to a reference size which is sum of a beam spot diameter of the light beam and a distance traveled by the light beam within a time amounting to a sum of rising and falling time constants of a light beam power; and irradiating a light beam formed by a plurality of recording pulses when forming a recording mark having a size greater than the predetermined size N. According to the recording method of the present invention, it is possible to set a recording strategy capable of obtaining a sufficiently high power for a pulse-shaped light beam which is irradiated on the optical recording medium when forming amorphous recording marks at a high speed, and can even cope with a recording speed on the order of 6-times speed or higher in the case of a DVD, to realize satisfactory recording characteristics such as modulation factor and jitter. This is because the suitable number of recording pulses with respect to the recording mark is determined by taking into consideration the rising and falling time constants of the light beam.

The predetermined size N may be set to 0.55 times±10% of the reference size.

The irradiating the light beam formed by the plurality of recording pulses may irradiate a light beam formed by p+1 recording pulses when forming a recording mark which has a size greater than pN and less than or equal to (p+1)N, where p is an integer greater than or equal to 1. In this case, it is possible to obtain a sufficiently high power for a pulse-shaped light beam which is irradiated on the optical recording medium when forming amorphous recording marks at a high speed, because the number of recording pulses is appropriately assigned with respect to the recording mark lengths, to thereby realize satisfactory recording characteristics with reduced jitter.

The plurality of recording pulses may form a pulse train ($N_1$+N+N+ . . . ) which is made up of a start pulse $N_1$ having a size which is obtained by multiplying 1.3±0.1 to the predetermined size N, and subsequent pulses N having the predetermined size N; and the irradiating the light beam formed by the plurality of recording pulses may irradiate a light beam formed by a number of recording pulses determined by the pulse train ($N_1$+N+N+ . . . ) when forming the recording mark. In this case, it is possible to further reduce the jitter, because the start pulse $N_1$ has a size which is 1.3±0.1 times the predetermined size N.

The mark length modulation may be an Eight-to-Fourteen Modulation (EFM) Plus modulation (EFM+ modulation), and the number of recording pulses for forming EFM mark lengths of 3T to 14T under recording conditions where an optical system used has a pickup with a Numerical Aperture (N.A.) of 0.65, emits the light beam having a wavelength of approximately 660 nm with a recording linear velocity set to 20 m/sec to 42 m/sec, may be set to 1 for 3T to 5T, 2 for 6T to 8T, 3 for 9T to 11T, and 4 for 14T. In this case, it is possible to obtain a sufficiently high power for a pulse-shaped light beam which is irradiated on the optical recording medium when forming amorphous recording marks at a high speed, because the number of recording pulses is appropriately assigned with respect to the recording mark lengths by taking into consideration the EFM+ modulation and the light beam characteristic, to thereby realize satisfactory recording characteristics with reduced jitter.

The irradiating the light beam formed by the single recording pulse may add a preheating pulse before the single recording pulse. In addition, the preheating pulse may have an irradiation time which is greater than or equal to one channel period and is less than or equal to two channel periods, and a power which takes an intermediate value between a recording power and an erasing power of the single recording pulse when recording an EFM mark length of 3T by the single recording pulse. In this case, it is possible to separate the minimum recording length even during the high-speed recording, by the addition of the preheating pulse, to thereby enable positive recording of the recording mark lengths and obtain satisfactory recording characteristics.

A further object of the present invention is to provide a phase change type optical recording medium comprising a substrate; a crystallized phase change recording layer disposed above the substrate, to receive a pulse-shaped light beam when forming recording marks by a mark length modulation; and a reflection layer disposed above the phase change recording layer, wherein the phase change recording layer is made of a material having a composition ratio near an eutectic composition of Sb and Ga, and receives a light beam formed by a single recording pulse when forming a recording mark having a size less than or equal to a predetermined size N, and receives a light beam formed by a plurality of recording pulses when forming a recording mark having a size greater than the predetermined size N, the predetermined size N being set with reference to a reference size which is sum of a beam spot diameter of the light beam and a distance traveled by the light beam within a time amounting to a sum of rising and falling time constants of a light beam power. According to the phase change type optical recording medium of the present invention, it is possible to cause a sufficient optical change in the phase change recording layer to enable recording, erasure and rewriting of information, even when the light beam is irradiated at a high speed and formed by a number of recording pulses set according to a recording strategy, since the phase change recording layer is made of a material near the eutectic composition of Sb and Ga. In addition, it is possible to obtain satisfactory recording characteristics with a large modulation factor and reduced jitter.

The phase change recording layer may further include in the SbGa eutectic composition 15 at. % or less of at least one element selected from a group consisting of Ge, In, Mn and Sn. In this case, it is possible to adjust the characteristics such as the recording linear velocity response and the modulation factor, to cope with various demands on the performance of the phase change type optical recording medium.

The plurality of recording pulses may form a pulse train ($N_1$+N+N+ . . . ) which is made up of a start pulse $N_1$ having a size which is obtained by multiplying 1.3±0.1 to the predetermined size N, and subsequent pulses N having the predetermined size N, and a number of recording pulses received by the phase change recording layer is determined by the pulse train ($N_1$+N+N+ . . . ) when forming the recording mark. In this case, it is possible to reduce the jitter even when the start pulse $N_1$ has the size described above and the light beam is irradiated on the phase change type optical recording medium at a high speed, because the phase change recording layer is made of the material near the eutectic composition of Sb and Ga.

The phase change type optical recording medium may have a reflectively greater than or equal to 15% and a modulation factor greater than or equal to 0.4 at the time of a reproduction when recording conditions are such that the mark length modulation is an Eight-to-Fourteen Modulation (EFM) Plus modulation (EFM+ modulation), and the number of recording pulses received by the phase change recording layer for forming EFM mark lengths of 3T to 14T using an optical system which has a pickup with a Numerical Aperture (N.A.) of 0.65, emits the light beam having a wavelength of approximately 660 nm with a recording linear velocity set to 20 m/sec to 42 m/sec, is set to 1 for 3T to 5T, 2 for 6T to 8T, 3 for 9T to 11T, and 4 for 14T. In this case, it is possible to obtain a sufficient light beam power to record an amorphous mark in the phase change recording layer, even when the light beam is irradiated at a high speed and formed by a number of recording pulses set according to a recording strategy which takes into consideration the EFM+ modulation and the light beam characteristic, since the phase change recording layer is made of a material near the eutectic composition of Sb and Ga. In addition, it is possible to obtain satisfactory recording characteristics with a large modulation factor and reduced jitter.

The phase change recording layer may receive the light beam formed by the single recording pulse and added with a preheating pulse before the single recording pulse. The phase change type optical recording medium may have a reflectively greater than or equal to 15% and a modulation factor greater than or equal to 0.4 at the time of a reproduction when recording conditions are such that the preheating pulse has an irradiation time which is greater than or equal to one channel period and is less than or equal to two channel periods, and a power which takes an intermediate value between a recording power and an erasing power of the single recording pulse when recording an EFM mark length of 3T by the single recording pulse. In this case, it is possible to separate the minimum recording length even during the high-speed recording, by the addition of the preheating pulse, to thereby enable positive recording of the recording mark lengths and obtain satisfactory recording characteristics.

The phase change type optical recording medium may have a reflectively greater than or equal to 15% and a modulation factor greater than or equal to 0.4 at the time of a reproduction when recording conditions are such that: the mark length modulation is an Eight-to-Fourteen Modulation (EFM) Plus modulation (EFM+modulation), the number of recording pulses received by the phase change recording layer for forming EFM mark lengths of 3T to 14T using an optical system which has a pickup with a Numerical Aperture (N.A.) of 0.65, emits the light beam having a wavelength of approximately 660 nm with a recording linear velocity set to 20 m/sec to 42 m/sec, is set to 1 for 3T to 5T, 2 for 6T to 8T, 3 for 9T to 11T, and 4 for 14T, and the phase change recording layer receives the light beam formed by the single recording pulse and is added with a preheating pulse before the single recording pulse, wherein the preheating pulse has an irradiation time which is greater than or equal to one channel period and is less than or equal to two channel periods, and a power which takes an intermediate value between a recording power and an erasing power of the single recording pulse when recording an EFM mark length of 3T by the single recording pulse. In this case, it is possible to separate the minimum recording length even during the high-speed recording, by the addition of the preheating pulse, to thereby enable positive recording of the recording mark lengths and obtain satisfactory recording characteristics.

Other objects and further features of the present invention will be apparent from the following detailed description when read in conjunction with the accompanying drawings.

DESCRIPTION OF THE PREFERRED EMBODIMENTS

A description will be given of embodiments of a phase change type optical recording medium according to the present invention and a recording method according to the present invention, by referring to FIG. 4 and the subsequent drawings.

Figure 1:
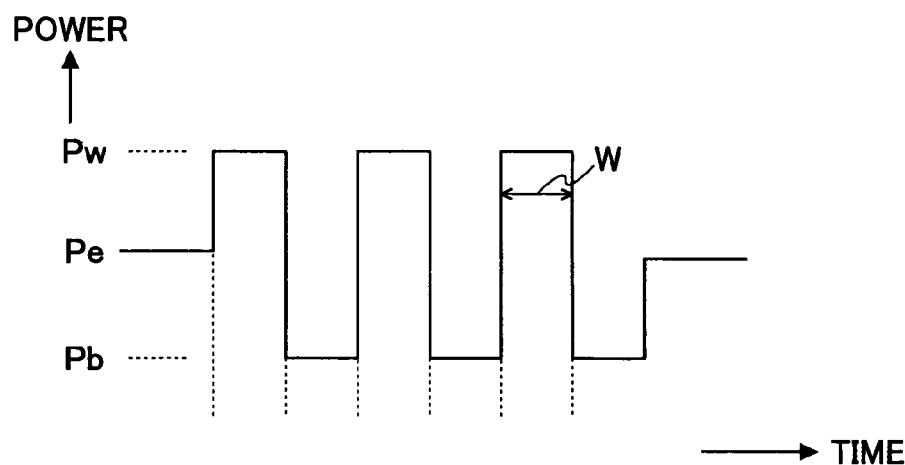
FIG. 1 is a diagram showing recording pulses used by a conventional recording method.
Figure 2:
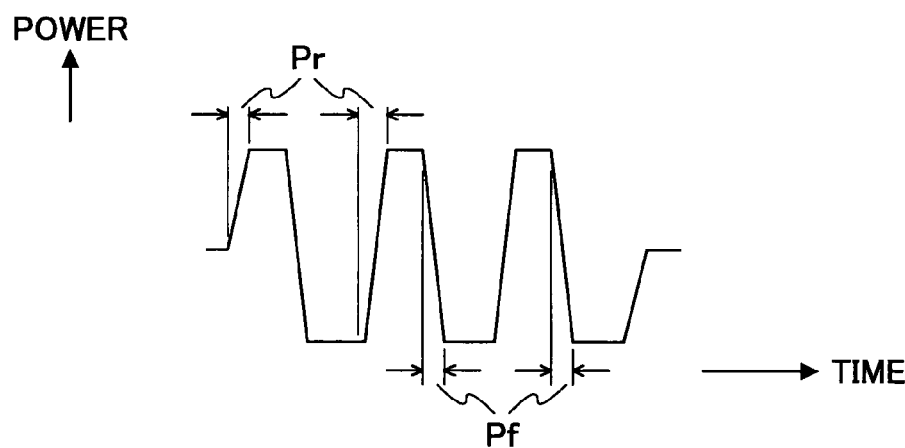
FIG. 2 is a diagram showing rising and falling edges of recording pulses which can be formed by direct modulation of an existing semiconductor laser diode.
Figure 3:
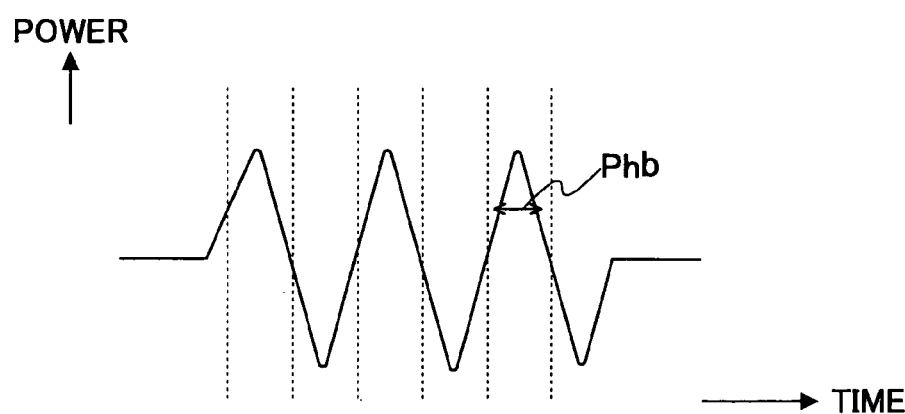
FIG. 3 is a diagram showing a half breadth of actual recording pulses used by the conventional recording method.
Figure 4:
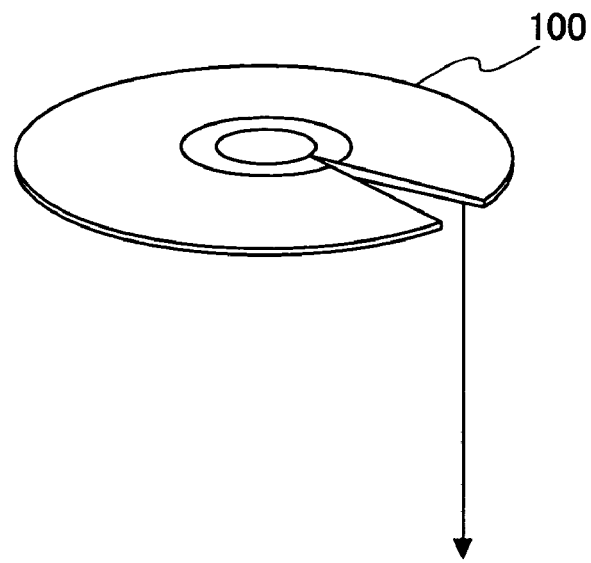
FIG. 4 is a perspective view, with a portion cut away, showing an embodiment of a phase change type optical recording medium according to the present invention.
Figure 5:
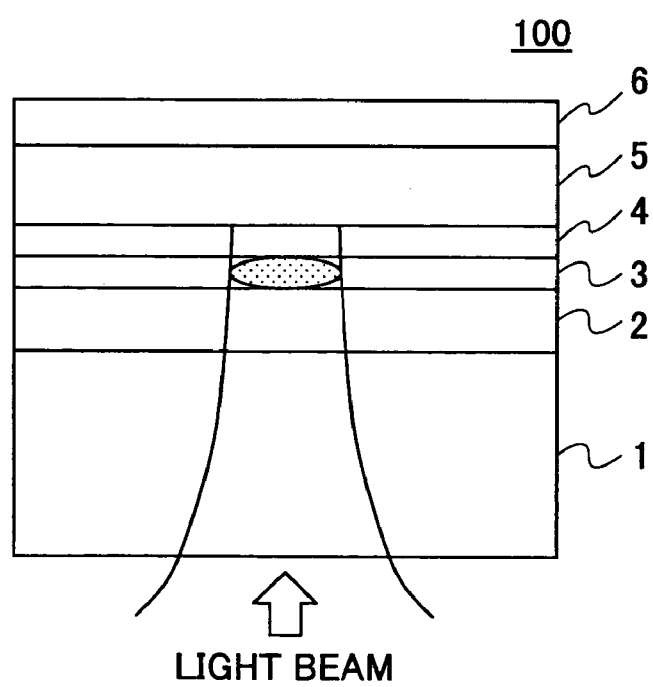
FIG. 5 is a cross sectional view showing the cut away portion of the phase change type optical recording medium shown in FIG. 4.

FIG. 4 is a perspective view, with a portion cut away, showing an embodiment of the phase change type optical recording medium according to the present invention. FIG. 5 is a cross sectional view showing the cut away portion of the phase change type optical recording medium shown in FIG. 4.

A phase change type recording medium 100 shown in FIG. 4 includes a transparent substrate 1, a lower protection layer 2, a phase change recording layer 3, an upper protection layer 4, a reflection layer 5, and an overcoat layer 6 which are stacked as shown in FIG. 5. Of course, it is not essential for the present invention to employ the exact stacked structure shown in FIG. 5.

A recording material used for the phase change recording layer 3 may be have a composition ratio near eutectic composition of Sb and Ga, which is suited for carrying out a high-speed recording. For example, the phase change recording layer 3 may be formed by a sputtering technique using a recording target which has a composition near the eutectic composition, so that the composition ratio becomes near the eutectic composition of Sb and Ga. Normally, the phase change recording layer 3 has a crystal phase (erased state) due to initialization. By irradiating on the phase change recording layer 3 a light beam which is modulated by the recording method according to the present invention, for example, a recording mark in an amorphous state is formed in the phase change recording layer 3.

The material used for the phase change recording layer 3 is of course not limited to the SbGa eutectic composition. For example, the phase change recording layer 3 may be formed by adding 15 atomic percent (at. %) or less of at least one element selected from a group of Ge, In, Mn and Sn to the SbGa eutectic composition. By adding the elements such as Ge, In, Mn and Sn to the SbGa eutectic composition, it is possible to suitably adjust characteristics of the phase change type optical recording medium 100, such as recording linear velocity response and modulation factor. If the addition of such elements to the SbGa eutectic composition exceeds 15 at. %, the recording characteristics may deteriorate and the reflectivity may change with lapse of time (aging), due to deteriorated recording linear velocity response. If an amount of Sn exceeding 15 at. % is added to the SbGa eutectic composition, a storage stability of the recording mark may deteriorate due to crystallization velocity which becomes too fast.

The transparent substrate 1 may be made of glass, resin or the like. In this embodiment, a resin is used for the transparent substrate 1, because the resin is easy to mold and is inexpensive. Typical examples of the resins which may be used for the transparent substrate 1 include polycarbonate resin and acrylic resin which have good light transmittance. The polycarbonate resin is desirably used for the transparent substrate 1 from the point of view of easy forming and good optical characteristic such as light transmittance.

The lower protection layer 2 may be made of a dielectric such as ZnS and $SiO_2$. The upper protection layer 4 may be made of the same material as the lower protection layer 2. In this embodiment, the upper protection layer 4 is made of a material selected from metal oxides, nitrides, carbides and mixtures thereof.

Each of the upper and lower protection layers 4 and 2 may be formed by appropriate materials using various vapor deposition techniques such as vacuum deposition, sputtering, plasma CVD, optical CVD, ion plating, and electron beam deposition.

The reflection layer 5 may be formed by metals which are relatively strong against corrosion, such as Al, Ag, Cu and Au, or alloys having such metals as a main component.

The overcoat layer 6 may be provided on the reflection layer 5 if necessary. The overcoat layer 6 may be formed by ultraviolet curing resins, resins which cure by cationic polymerization, and the like. In the case where this embodiment is applied to the DVD, a substrate identical to the transparent substrate 1 may be provided on the reflection layer 5, and the overcoat layer 6 may also function as a bonding material in such a case.

Next, a description will be given of an embodiment of the recording method according to the present invention. In this embodiment of the recording method, it is assumed for the sake of convenience that the light beam is irradiated on the phase change recording layer 3 of the phase change type optical recording medium 100 shown in FIGS. 4 and 5. Basically, a recording strategy which is employed in this embodiment when forming the recording mark by the mark length modulation, determines the number of recording pulses of the light beam based on a predetermined size which is set based on a reference size. This reference size is obtained by adding a beam spot diameter (or size) of the light beam and a distance traveled by the light beam during times it takes for the light beam power to rise and fall.

For example, when carrying out the recording at a recording linear velocity which is within a range greater than or equal to 8-times speed and less than or equal to 12-times speed of the DVD, a number of pulses in each recording mark (mark length), denoted by p, can be determined based on the predetermined size, denoted by N, based on the following formula (1) which defines a boundary of the number of recording pulses.

$$\text{(Mark Length)} \geq p \times N \quad (1)$$

The predetermined size N can be determined from the following formula (2), where L denotes the beam spot diameter, and X denotes the distance traveled by the light beam during the times it takes for the light beam to rise and fall.

$$N = 0.55 \times (L + X) \quad (2)$$

For example, if the beam spot diameter L is approximately 0.92 µm in an optical system of the recording apparatus, and the rising and falling time constants of the light beam emitted from the semiconductor laser diode (LD) are 2 nsec, the light beam travels approximately 0.14 µm during a time which is a sum of the rising and falling time constants of the light beam in the case of a 10-times speed recording. Accordingly, the predetermined size N is approximately 0.583 µm which is 0.55 times the total of 1.06 µm of the beam spot diameter L=0.92 µm and the distance of 0.14 µm traveled by the light beam.

Therefore, when the size of the recording mark is less than or equal to the predetermined size N, a light beam corresponding to a single recording pulse is irradiated on the phase change type optical recording medium to record information thereon. On the other hand, when the size of the recording mark exceeds pN but is less than or equal to (p+1)N, where p is an integer greater than or equal to 1, the number of pulses is set depending on the size of the recording mark so that the number of recording pulses becomes p+1, and a light beam corresponding to this number of recording pulses is irradiated on the phase change type optical recording medium to record information thereon.

A particular method of obtaining the boundary of the number p of recording pulses is a follows. If the beam spot diameter is 0.92 µm and the time it takes for the light beam power to rise and fall is 4 nsec, pN=0.567 at 8-times speed (8×), pN=0.583 at 10-times speed (10×), and pN=0.598 at 12-times speed (12×), when p=1 in the formula (1). These pN values are intermediate values of the actual mark lengths corresponding to Eight-to-Fourteen Modulation (EFM) mark lengths 4T and 5T in the following Table 1.

TABLE 1

| EFM Mark Length | Actual Mark length (µm) |
|---|---|
| 3 T | 0.40 |
| 4 T | 0.53 |
| 5 T | 0.67 |
| 6 T | 0.80 |
| 7 T | 0.93 |
| 8 T | 1.06 |
| 9 T | 1.20 |
| 10 T | 1.33 |

TABLE 1-continued

| EFM Mark Length | Actual Mark length (μm) |
|---|---|
| 11 T | 1.46 |
| 14 T | 1.86 |

In this case, 1 recording pulse is selected for recording the EFM mark lengths up to 4T, and 2 recording pulses are selected for recording the EFM mark lengths greater than or equal to 5T. In addition, if p=2, the pN value at 8-times speed becomes 1.135, the pN value at 10-times speed becomes 1.166, and the pN value at 12-times speed becomes 1.196, and 2 recording pulses are selected for recording the EFM mark lengths of 5T to 8T, and 3 recording pulses are selected for recording the EFM mark lengths greater than or equal to 9T. Similarly, the number p of recording pulses for recording all of the EFM mark lengths may be selected (or set) by similarly by determining the boundaries p=3 and p=4.

By assigning the number p of recording pulses to be used for recording EFM mark lengths of 3T to 14T based on the predetermined size N which is used as the reference, the number p of recording pulses becomes 1 for 3T to 4T, 2 for 5T to 8T, 3 for 9T to 11T, and 4 for 14T. By distributing the number p of recording pulses in this manner for the various EFM mark lengths, it becomes possible to obtain a sufficiently high light beam power, that is, a sufficiently high recording (write) power, even at high recording linear velocities.

Of course, another recording strategy, which determines the number of recording pulses for recording the recording mark lengths based on a pulse train ($N_1$+N+N+ . . . ), may be employed. This pulse train ($N_1$+N+N+ . . . ) is made up of a start pulse $N_1$ having a size which is obtained by multiplying 1.3±0.1 to the predetermined size N, and subsequent pulses N having the predetermined size N.

For example, when carrying out the recording at the recording linear velocity which is within the range greater than or equal to the 8-times speed and less than or equal to the 12-times speed of the DVD, the number p of recording pulses in each recording mark (mark length) is determined in a manner similar to the above by setting the start pulse $N_1$ to N×(1.3±0.1) and setting the subsequent pulses N to N. If p=1, the pN value between 5T and 6T is obtained for the 8-times speed to the 12-times speed by calculation, and from this calculation result, the number p of recording pulses for recording the EFM mark lengths of 3T to 5T can be selected (or set) to 1 by taking into consideration the inconsistencies in the beam spot diameter and the rise time of the recording pulse when making the calculation. The fall time does not need to be taken into consideration when making this calculation, as long as the fall time is not extremely slow. Similarly, the number p of recording pulses for recording all of the EFM mark lengths may be selected (or set) by determining the boundaries p=2, p=3 and p=4.

More particularly, the number p of recording pulses used to record each recording mark length is determined based on the pulse train made up of the start pulse $N_1$ having a size of 0.758 μm which is obtained by multiplying 1.3±0.1 to the predetermined size N=0.583 μm and the subsequent pulses N having the predetermined size N=0.583 μm.

Figure 6:
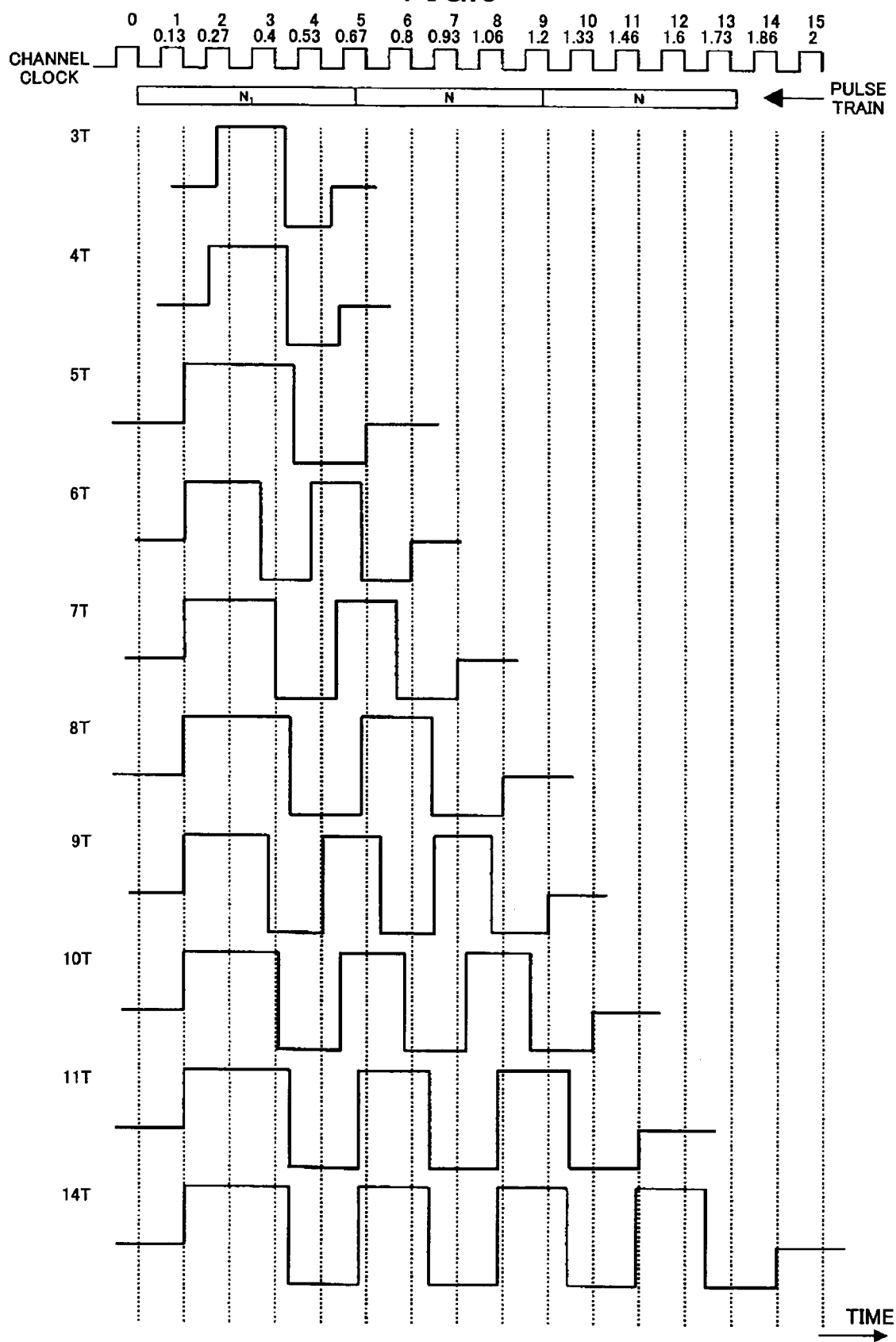
FIG. 6 is a diagram showing recording pulses corresponding to each of recording marks, assigned by a pulse train made up of a start pulse $N_1$ and subsequent pulses N, according to a recording strategy employed by an embodiment of a recording method according to the present invention.

By assigning the number p of recording pulses to be used for recording the EFM mark lengths of 3T to 14T based on this recording strategy, the number p of recording pulses becomes 1 for 3T to 5T, 2 for 6T to 8T, 3 for 9T to 11T, and 4 for 14T. FIG. 6 is a diagram showing the recording pulses corresponding to each of the recording marks assigned by the pulse train made up of the start pulse $N_1$ and the subsequent pulses N according to the recording strategy employed by this embodiment of the recording method according to the present invention. In other words, FIG. 6 shows the number p of recording pulses corresponding to each of the recording mark lengths. By distributing the number p of recording pulses in this manner for the various recording mark lengths, it becomes possible to obtain a sufficiently high light beam power, that is, a sufficiently high recording (write) power, even at high recording linear velocities, and the jitter can be reduced further compared to the above described distribution of the number p of recording pulses.

According to the experiments conducted by the present inventors, it was found that in the recording linear velocity range described above, particularly the setting boundary of the single recording pulse affects the recording characteristics. For example, in the case where the recording linear velocity is set to the ten-times speed of the DVD, it was found that the jitter is further reduced by carrying out the recording using a single recording pulse for the EFM mark lengths of up to 5T.

On the other hand, when covering a plurality of recording mark lengths by a single recording pulse, there is a tendency for the shortest mark (minimum length mark) to become difficult to separate.

For example, in the case of the EFM used in the DVD, if the single recording pulse is to be used to record the EFM mark lengths of 3T to 5T for a high-speed recording on the order of the 8-times speed or higher, the recording pulse width for the 3T mark must be set shorter compared to those of the 4T and 5T marks due to the effects of the rise characteristic of the light beam which is used for the recording. Although this problem of having to set the recording pulse width for the 3T mark shorter is not as notable in the case where the recording linear velocity is the 8-times speed, a sufficient melting range of the phase change recording layer material may not be formed when recording the 3T mark in the case of the recording linear velocity greater than or equal to the 10-times speed. As a result, a sufficient amorphous mark width may not be obtained, to thereby deteriorate the modulation factor. In addition, if the rise start time of the recording pulse is set earlier for the 3T mark than the 4T and 5T marks so as to secure a sufficient melting region and improve the modulation factor for the 3T mark, it is possible to obtain a sufficient modulation factor but it becomes difficult to distinguish and separate the 3T mark from the 4T mark in the longitudinal direction thereof.

Figure 7:
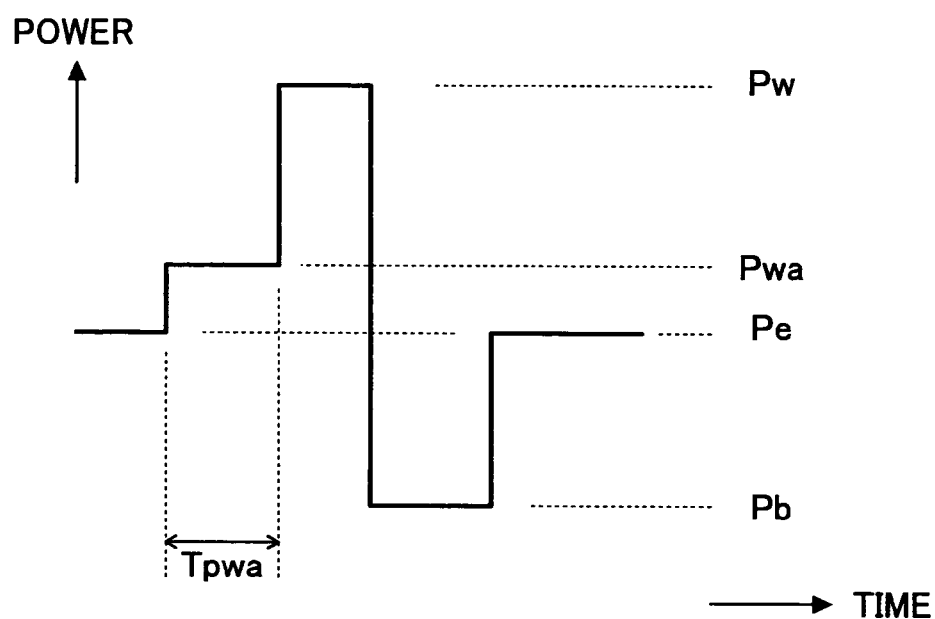
FIG. 7 is a diagram for explaining a power level of a preheating pulse which is added before a single recording pulse.

Hence, in order to avoid such problems, a modification of this embodiment adds a preheating pulse before the recording pulse when recording the recording mark length using a single recording pulse, so that the recording mark length is positively formed even for the high-speed recording and satisfactory recording characteristics can be obtained. In other words, as a means of applying a sufficient light beam power with respect to the phase change type optical recording medium to enable recording by the shortest recording pulse (minimum recording pulse width), a preheating pulse is added before the single recording pulse as shown in FIG. 7. FIG. 7 is a diagram for explaining a power level of the preheating pulse which is added before the single recording pulse. In FIG. 7, the ordinate indicates the power level of the recording pulses, and the abscissa indicates the time. In FIG. 7, Pw denotes a recording (write) power, Pe denotes an erasing power, Pb denotes a bottom power, Pwa denotes a preheating power of the preheating pulse, and Tpwa denotes a pulse width (or irradiation time) of the preheating pulse.

The power level Pwa of the preheating pulse is set so that the temperature of the phase change recording layer will not reach the melting point of the phase change recording layer material. As a result, it is possible to reduce the time it takes for the phase change recording layer material to reach the melting point when the recording pulse is applied, to thereby simultaneously enable a modulation factor having a sufficient width to be obtained and enable the 3T mark to be distinguished from the 4T mark and separated in the longitudinal direction thereof.

Particularly, it is desirable that the power level Pwa of the preheating pulse takes an intermediate value between the recording power Pw and the erasing power, and that the preheating pulse is added before the number of recording pulses corresponding to the recording mark length 3T with the irradiation time Tpwa which is greater than or equal to the channel period and less than or equal to two times the channel period. The "channel" indicates the time or spatial length per data bit, and is standardized for the DVD, for example.

From the experiments conducted by the present inventors, it was found that the irradiation time Tpwa of the preheating pulse needs to be set greater than or equal to 5 nsec. Otherwise, if the irradiation time Tpwa of the preheating pulse is less than 5 nsec, a notable improvement of the jitter characteristic could not seen by the addition of the preheating pulse as compared to the case where no preheating pulse is added. But if the irradiation time Tpwa of the preheating pulse is 5 nsec or greater, it was found that the jitter can be reduced by approximately 1% compared to the case where no preheating pulse is added.

Figure 8:
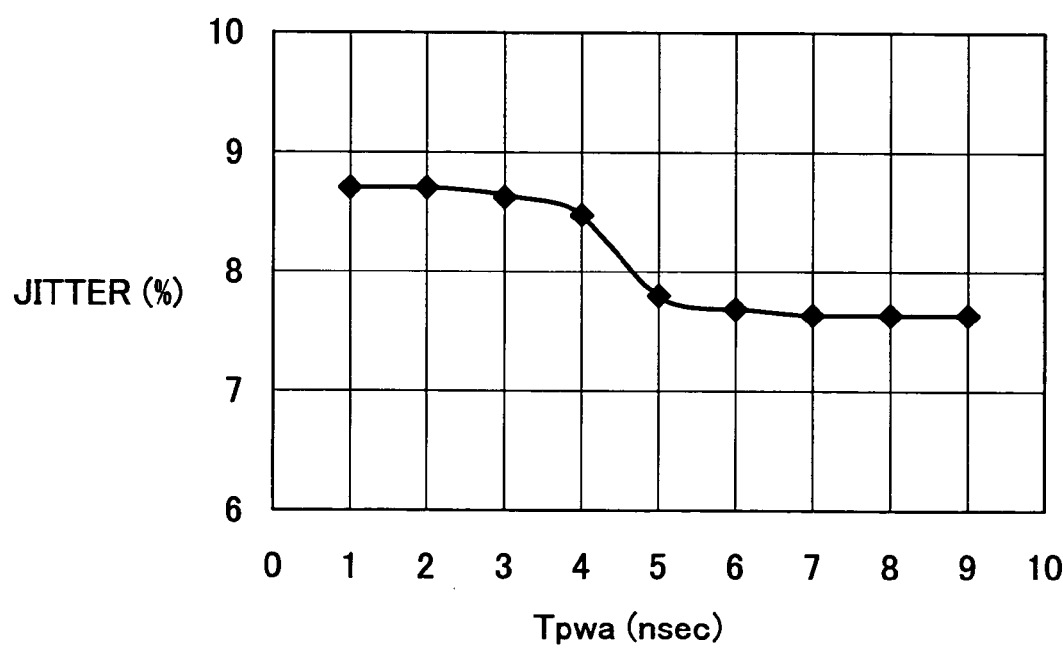
FIG. 8 is a diagram showing a relationship of an irradiation time of the preheating pulse and jitter for a case where a recording linear velocity is 10-times speed of DVD.

FIG. 8 is a diagram showing a relationship of the irradiation time Tpwa of the preheating pulse and jitter for a case where the recording linear velocity is 10-times speed of the DVD. FIG. 8 shows the relationship for a case where the power level Pwa of the preheating pulse is 12 mW, and the recording power Pw of the recording pulse is 28 mW. In FIG. 8, the ordinate indicates the jitter (%), and the abscissa indicates the irradiation time Tpwa (nsec) of the preheating pulse. As may be seen from FIG. 8, the jitter takes a satisfactory low value when the irradiation time Tpwa of the preheating pulse is 5 nsec or greater.

On the other hand, when the effects on other recording marks are taken into consideration, it was found desirable that the irradiation time Tpwa of the preheating pulse is approximately 1.5T which is less than or equal to one-half the 3T mark corresponding to the shortest mark. The effects of the preheating pulse was seen at power levels Pwa of 8 mW or greater, and it was found that the power level Pwa is desirably 20 mW or less, and more desirably 16 mW or less, for a recording linear velocity between 8-times speed and 12-times speed of the DVD.

It was also found that the modulation factor is 0.4 or greater and the reflectivity is 15% or greater when recording the information on the phase change type optical recording medium by this embodiment of the recording method.

The parameter ranges described above satisfy the prescribed values for achieving compatibility with the DVD-ROM, and it is therefore possible to obtain satisfactory recording characteristics or performance even when carrying out the high-speed recording of the information.

Furthermore, the present inventors found that the recording strategy employed by the present invention, which sets the number p of recording pulses based on the predetermined size N, allows for a margin (or degree of freedom) in setting the number of recording pulses. From the experiments conducted by the present inventors, the degree of freedom may be regarded to be approximately ±10%.

Figure 9A:
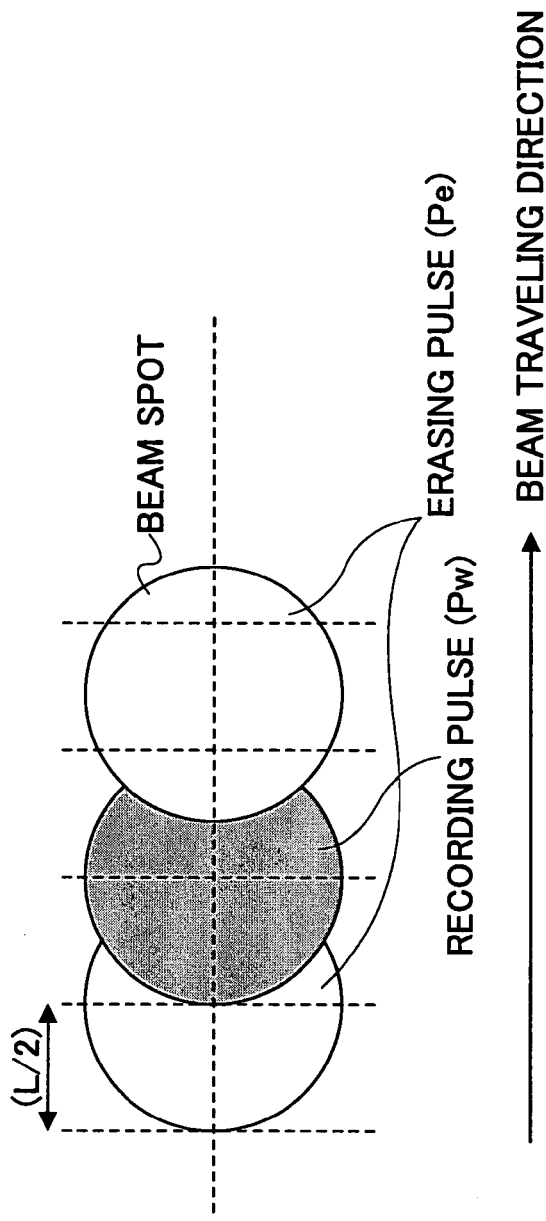
FIGS. 9A and 9B respectively are diagrams for explaining a limit of a degree of freedom with which the number of recording pulses may be set.
Figure 9B:
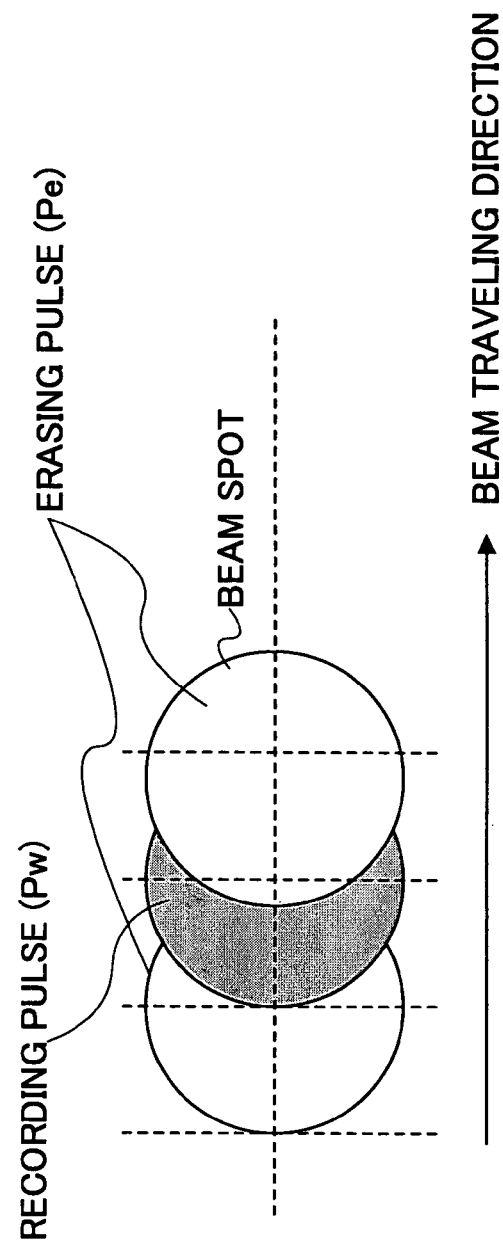

FIGS. 9A and 9B respectively are diagrams for explaining a limit of the degree of freedom with which the number of recording pulses may be set.

A trailing edge of the recording mark is crystallized and determined by the recording pulse (erasing pulse) having the erasing power Pe, but particularly when an attempt is made to extend the mark length recordable by a single recording pulse to a larger recording mark, the mark edge must be formed at a portion of the recording mark which is smaller in a direction taken along the width of the recording mark with respect to a track on the phase change type optical recording medium, as shown in FIG. 9A. Since the inconsistency of the mark edge will increase according to such a recording, it is desirable for the light beams respectively corresponding to the recording pulse having the recording power Pw and the recording pulse (erasing pulse) having the erasing power Pe to overlap at a portion of the recording mark which is larger in the direction taken along the width of the recording mark with respect to the track, and to form the mark edge at this portion, as shown in FIG. 9B. In FIGS. 9A and 9B, the track extends in a beam traveling direction indicated by an arrow. According to the experiments conducted by the present inventors, it was found that the jitter virtually does not increase if the mark edge is formed at a portion which is located a distance which is approximately 0.6 times the beam spot diameter L of the light beam used for the recording from a leading edge of the recording mark. In a case where an optical system used has a pickup with a Numerical Aperture (N.A.) having a center value of 0.65 and emits a light beam having a wavelength of approximately 660 nm, such a tolerance in terms of a change in the N.A. may be described as being approximately 0.65±2. Hence, it is desirable that the N.A. of the pickup (lens) of the optical system is in the range of approximately 0.65±2 when employing the recording strategy described above. However, when actually producing the recording apparatus, it is more desirable for the tolerance of the N.A. to be approximately 0.65±1 by taking into consideration other inconsistencies of the optical system.

Next, a description will be given of the performances of the embodiment and modification of the present invention described above, compared to those of comparison examples.

In the embodiment of the phase change type optical recording medium used for the comparison, the overcoat layer 6 shown in FIG. 5 was omitted. More particularly, the transparent substrate 1 used was made of polycarbonate with a thickness of 0.6 mm and was provided with a guide groove for the light beam which is used for the recording. The lower protection layer 2 was made of a mixture of ZnS and $SiO_2$ (20 mol %) which is sputtered to a thickness of approximately 70 nm on the transparent substrate 1. The phase change recording layer 3 was made of GaSb and sputtered on the lower protection layer 2 to a thickness of approximately 15 nm, The upper protection layer 4 was made of the same material as the lower protection layer and sputtered on the phase change recording layer 3 to a thickness of approximately 15 nm. The reflection layer 5 was made of an AgCu alloy and sputtered on the upper protection layer 4 to a thickness of approximately 150 nm. The phase change type optical recording medium was completed by bonding a substrate, which is made of the same material as the transparent substrate 1, on the reflection layer 5 using an ultraviolet curing resin. The phase change recording layer 3 was formed by a sputtering technique using a recording target which has a composition near the eutectic composition, so that the composition ratio becomes near the eutectic composition of Sb and Ga. More particularly, the composition ratio was 88 at. % Sb and 12 at. % Ga.

The modulation factor of this phase change type optical recording medium was measured using a recording apparatus which is generally used for recording information on the rewritable DVD, by a pickup which has a Numerical Aperture (N.A.) of 0.65 and emits a light beam having a wavelength of approximately 660 nm. Direct overwrite operations were made 10 times with respect to this phase change type optical recording medium for evaluation, for each of three recording strategies, namely, a first (conventional) recording strategy using the basic period of 1T (first comparison example) and a second (conventional) recording strategy using the basic period of 2T (second comparison example), and a third recoding strategy employed by the embodiment. The measurements were made at the recording linear velocity which is the 10-times speed of the DVD (34.9 m/sec), and the recording power Pw of the recording pulse was set to 30 mW, while the erasing power Pe of the recording pulse (erasing pulse) at the space portion was set to 6 mW. The pulse width of the recording pulses were optimized for each of the first, second and third recording strategies so that the modulation factor is maximized.

Figure 10:
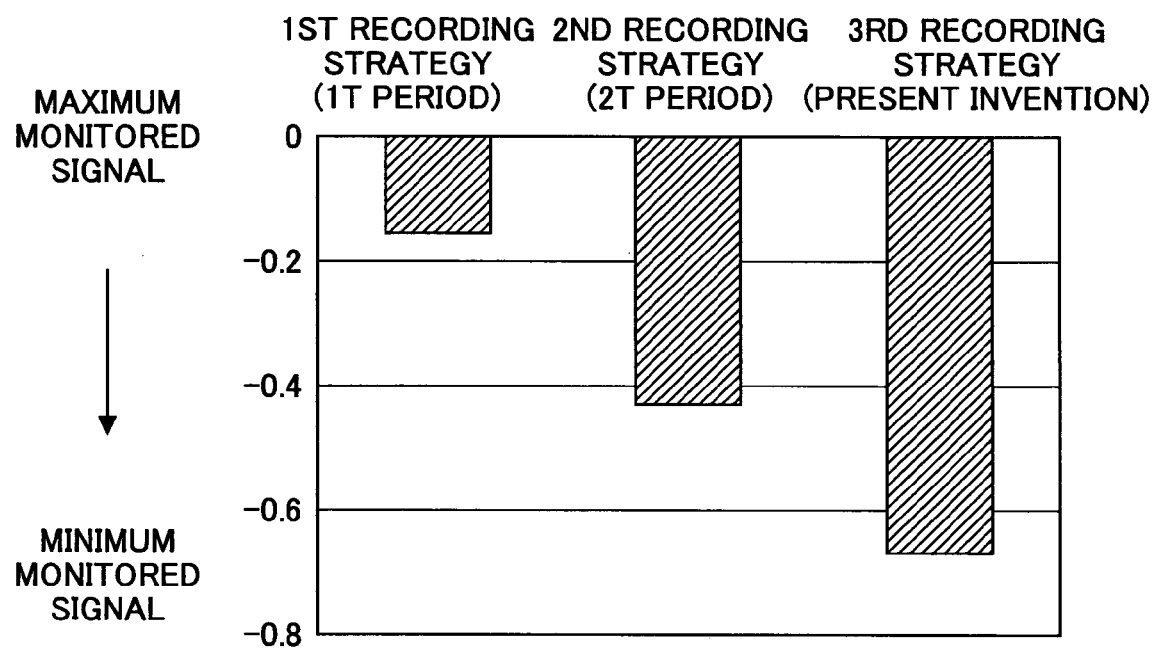
FIG. 10 is a diagram showing a comparison of monitored signals obtained by the recording strategy employed by the present invention and the conventional recording strategies.

Reflection changes were monitored for each recorded track on which the amorphous recording marks were written by using each of the recording strategies. The monitored reflection was converted into electrical data (monitored signals) by using a photodiode in a tester, and the electrical data were standardized using maximum power. Results of the monitored signals are shown in FIG. 10. FIG. 10 is a diagram showing a comparison of the monitored signals obtained by the first and second (conventional) recording strategies and the third recording strategy employed by the embodiment of the present invention. In FIG. 10, an absolute reflectivity is approximately 22%. The modulation factor can be obtained from the following formula (3), where Mmax denotes the maximum monitored signal and Mmin denotes the minimum monitored signal.

(Modulation Factor)=(Mmax−Mmin)/Mmax  (3)

According to the first (conventional) recording strategy employed by the first comparison example, the number of recording pulses is increased by one depending on the channel period 1T. According to the second (conventional) recording strategy employed by the second comparison example, the number of recording pulses is increased by one depending on the channel period 2T.

On the other hand, according to the third recording strategy employed by the embodiment of the present invention, the rising and falling time constants of the recording pulses respectively are 2 nsec, and in the case of the 10-times speed of the DVD, the light beam travels approximately 0.14 μm during a time which is a sum of the rising and falling time constants. In addition, in the optical system of the recording apparatus, the beam spot diameter corresponding to the light beam power of $1/e^2$ is approximately 0.92 μm. Hence, 0.55 times the sum of the beam spot diameter and the distance traveled by the light beam can be calculated to be approximately 0.583 μm. By assigning the number p of recording pulses to be used for recording EFM mark lengths of 3T to 14T based on the predetermined size N=0.583 μm which is used as the reference, the number p of recording pulses was set to 1 for 3T to 4T, 2 for 5T to 8T, 3 for 9T to 11T, and 4 for 14T.

As may be readily seen from FIG. 10, the first and second (conventional) recording strategies employed by the first and second comparison examples clearly lack the necessary level of light beam power, that is, recording power level, compared to the third recording strategy employed in the embodiment of the present invention. Therefore, it was confirmed that the third recording strategy employed in the embodiment of the present invention is very effective compared to the first and second (conventional) recording strategies employed by the first and second comparison examples.

The performance of the phase change type optical recording medium was also measured for another fourth recording strategy which may be employed by the embodiment of the present invention, which determines the number of recording pulses for recording the recording mark lengths based on the pulse train ($N_1$+N+N+ . . . ). The start pulse $N_1$ of this pulse train ($N_1$+N+N+ . . . ) was set to a size of 0.758 μm which is obtained by multiplying 1.3±0.1 to the predetermined size N=0.583 μm, and the subsequent pulses N was set to a size equal to the predetermined size N=0.583 μm. By assigning the number p of recording pulses to be used for recording EFM mark lengths of 3T to 14T based on the pulse train ($N_1$+N+N+ . . . ), the number p of recording pulses was set to 1 for 3T to 5T, 2 for 6T to 8T, 3 for 9T to 11T, and 4 for 14T. Otherwise, the phase change type optical recording medium and the recording apparatus used for the measurement were the same as those described above which were used for the third recording strategy, and the jitter was evaluated under the same recording and reproducing conditions (the recording linear velocity which is the 10-times speed of the DVD) as those used to evaluate the modulation factor for the third recording strategy.

In addition, the jitter of the same phase change type optical recording medium was similarly evaluated according to the number p of recording pulses set by the third recording strategy described above.

The rising and falling time constants for fourth and third recording strategies were both optimized when making the evaluations, and results shown in the following Table 2 were obtained. The jitter (%) is obtained by dividing a time deviation (or inconsistency) of the recording mark edge by the channel period, and the smaller the jitter the smaller the mark edge shift to indicate that a satisfactory recording has been made.

TABLE 2

| Start Pulse Size | Jitter (%) |
|---|---|
| With $N_1$ | 7.9 |
| Without $N_1$ | 8.7 |

From the Table 2, it was confirmed that a satisfactory recording characteristics are obtained even when the start pulse $N_1$ is not added, but that the jitter can further be reduced by adding the start pulse $N_1$. The modulation factor was 0.60, and the reflectivity obtained from the maximum monitored signal of the recorded portion was 23%. These values of the modulation factor and reflectivity satisfy the prescribed values for achieving compatibility with the DVD-ROM, and it is therefore possible to obtain satisfactory recording characteristics or performance even when carrying out the high-speed recording of the information, by using the phase change type optical recording medium according to the present invention and the recording method according to the present invention.

Next, a description will be given of the recording performances of the embodiment of the phase change type optical recording medium evaluated for the 8-times speed, 10-times speed and 12-times speed of the DVD. The structure of the phase change type optical recording medium was the same as that described above used to evaluate the modulation factor for the third recording strategy. However, the phase change recording layer 3 was formed by sputtering using a target material having the following compositions for making the evaluations for the 8-times speed, 10-times speed and 12-times speed.

For 8-Times Speed: GaSb eutectic composition added with 5 at. % of Ge

For 10-Times Speed: GaSb eutectic composition

For 12-Times Speed: GaSb eutectic composition added with 5 at. % of Sn

In addition, the recording performance of the phase change type optical recording medium was similarly evaluated according to the number p of recording pulses set by the fourth recording strategy described above. Although the number of recording pulses for 5T in the case of the 8-times speed should be set to 2, the number of recording pulses for 5T in the case of the 8-times speed was set the same number as that in the case of the 10-times speed and the 12-times speed for the sake of convenience, and the recording was made by optimizing the recording power and the rising and falling time constants for each of the recording linear velocities.

The recording power is proportional to (recording velocity)$^{1/2}$, and the optimum recording power was 28 mW for the 8-times speed, 31 mW for the 10-times speed, and 34 mW for the 12-times speed. The following Table 3 shows the recording performance evaluated by the jitter.

TABLE 3

| Recording Velocity | Jitter (%) |
|---|---|
| 8-Times Speed | 8.2 |
| 10-Times Speed | 7.9 |
| 12-Times Speed | 8.7 |

As a result of the experiments conducted by the present inventors, it was found that a satisfactory jitter characteristic is obtained even at the 8-times speed of the DVD, as may be seen from the Table 3. Therefore, it was confirmed that the fourth recording strategy employed by the present invention allows for a margin (or degree of freedom) in setting the number of recording pulses, and that the margin (or degree of freedom) is approximately ±10%.

It was also confirmed from the experiments conducted by the present inventors that the limit of the margin (or degree of freedom) in setting the number of recording pulses may be up to approximately 0.6 times the beam spot diameter L of the light beam used for the recording from the leading edge of the recording mark, since the jitter virtually did not increase within this margin.

In the embodiment described above, 5 at. % of Ge is added to the phase change recording layer material in the case of the phase change type optical recording medium suited to operate at the 8-times speed of the DVD, so as to intentionally deteriorate the recording linear velocity response of the phase change type optical recording medium. However, it is of course possible to adjust the characteristics of the phase change type optical recording medium, such as the recording linear velocity response and the modulation factor, by further adding elements such as In, Mn and alloys thereof to the phase change recording layer material which is added with Ge. However, if the amount of the element added to the phase change recording layer material exceeds 15 at. %, the recording linear velocity response becomes too poor, to thereby deteriorate the recording characteristics and/or cause changes in the reflectivity with lapse of time (aging).

Further, in the embodiment described above, Sn is added to the phase change recording layer material in the case of the phase change type optical recording medium suited to operate at the 12-times speed of the DVD, so as to improve the recording linear velocity response of the phase change type optical recording medium. However, it is of course possible to adjust the characteristics of the phase change type optical recording medium, such as the modulation factor and the recording sensitivity, by further adding elements such as In, Mn, Ge and alloys thereof to the phase change recording layer material. However, if the amount of Sn added to the phase change recording layer material exceeds 15 at. %, the crystallization velocity becomes too fast, to thereby deteriorate the storage stability of the recording mark.

Moreover, in the embodiment described above, Ge, In, Mn, Sn and alloys thereof may be added to the phase change recording layer material in the case of the phase change type optical recording medium suited to operate at the 10-times speed of the DVD, so as to finely adjust the recording characteristics of the phase change type optical recording medium. However, problems similar to those described above for the phase change type optical recording media suited to operate at the 8-times speed and the 12-times speed of the DVD will occur, if the amount of the element added to the phase change recording layer material exceeds 15 at. %, Further, the present invention is not limited to these embodiments, but various variations and modifications may be made without departing from the scope of the present invention.

What is claimed is:

1. A recording method for forming recording marks according to a mark length modulation by irradiating a pulse-shaped light beam with respect to a crystallized phase change recording layer of a phase change type optical recording medium which comprises at least the phase change recording layer and a reflection layer on a substrate, said recording method comprising:

irradiating a light beam formed by a single recording pulse when forming a recording mark having a size less than or equal to a predetermined size N, said predetermined size N being set with reference to a reference size which is sum of a beam spot diameter of the light beam and a distance traveled by the light beam within a time amounting to a sum of rising and falling time constants of a light beam power, wherein the predetermined size N is set to 0.55 times ±10% of the reference size; and irradiating a light beam formed by a plurality of recording pulses when forming a recording mark having a size greater than the predetermined size N.

2. The recording method as claimed in claim 1, wherein said irradiating the light beam formed by the plurality of recording pulses irradiates a light beam formed by p+1 recording pulses when forming a recording mark which has a size greater than pN and less than or equal to (p+1)N, where p is an integer greater than or equal to 1.

3. The recording method as claimed in claim 1, wherein: said plurality of recording pulses form a pulse train $(N_1, N, N, \ldots)$ which is made up of a start pulse $N_1$ having a size which is obtained by multiplying 1.3±0.1 to the predetermined size N, and subsequent pulses N having the predetermined size N; and said irradiating the light beam formed by the plurality of recording pulses irradiates a light beam formed by a number of recording pulses determined by the pulse train ($N_1$,N,N, . . . ) when forming the recording mark.

4. The recording method as claimed in claim 3, wherein said mark length modulation is an Eight-to-Fourteen Modulation (EFM) Plus modulation (EFM+ modulation), and the number of recording pulses for forming EFM mark lengths of 3T to 14T under recording conditions where an optical system used has a pickup with a Numerical Aperture (N.A.) of 0.652, emits the light beam having a wavelength of approximately 660 nm with a recording linear velocity set to 20 m/sec to 42 m/sec, is set to 1 for 3T to 5T, 2 for 6T to 8T, 3 for 9T to 11T, and 4 for 14T.

5. The recording method as claimed in claim 3, wherein said irradiating the light beam formed by the single recording pulse adds a preheating pulse before the single recording pulse.

6. The recording method as claimed in claim 3, wherein said preheating pulse has an irradiation time which is greater than or equal to one channel period and is less than or equal to two channel periods, and a power which takes an intermediate value between a recording power and an erasing power of the single recording pulse when recording an EFM mark length of 3T by said single recording pulse.

7. A phase change type optical recording medium comprising:
a substrate;
a crystallized phase change recording layer disposed above the substrate, to receive a pulse-shaped light beam when forming recording marks by a mark length modulation; and
a reflection layer disposed above the phase change recording layer,
wherein said phase change recording layer is made of a material having a composition ratio near an eutectic composition of Sb and Ga, and receives a light beam formed by a single recording pulse when forming a recording mark having a size less than or equal to a predetermined size N, and receives a light beam formed by a plurality of recording pulses when forming a recording mark having a size greater than the predetermined size N, said predetermined size N being set with reference to a reference size which is sum of a beam spot diameter of the light beam and a distance traveled by the light beam within a time amounting to a sum of rising and falling time constants of a light beam power, wherein the predetermined size N is set to 0.55 times ±10% of the reference size.

8. The phase change type optical recording medium as claimed in claim 7, wherein said phase change recording layer further includes in the SbGa eutectic composition 15 at. % or less of at least one element selected from a group consisting of Ge, In, Mn and Sn.

9. A phase change type optical recording medium comprising:
a substrate;
a crystallized phase change recording layer disposed above the substrate, to receive a pulse-shaped light beam when forming recording marks by a mark length modulation; and
a reflection layer disposed above the phase change recording layer,
wherein said phase change recording layer is made of a material having a composition ratio near an eutectic composition of Sb and Ga, and receives a light beam formed by a single recording pulse when forming a recording mark having a size less than or equal to a predetermined size N, and receives a light beam formed by a plurality of recording pulses when forming a recording mark having a size greater than the predetermined size N, said predetermined size N being set with reference to a reference size which is sum of a beam spot diameter of the light beam and a distance traveled by the light beam within a time amounting to a sum of rising and falling time constants of a light beam power, and wherein said plurality of recording pulses form a pulse train ($N_1$,N,N, . . . ) which is made up of a start pulse $N_1$ having a size which is obtained by multiplying 1.3±0.1 to the predetermined size N, and subsequent pulses N having the predetermined size N, and a number of recording pulses received by said phase change recording layer is determined by the pulse train ($N_1$,N,N, . . . ) when forming the recording mark.

10. The phase change type optical recording medium as claimed in claim 9, which has a reflectively greater than or equal to 15% and a modulation factor greater than or equal to 0.4 at the time of a reproduction when recording conditions are such that said mark length modulation is an Eight-to-Fourteen Modulation (EFM) Plus modulation (EFM+ modulation), and the number of recording pulses received by said phase change recording layer for forming EFM mark lengths of 3T to 14T using an optical system which has a pickup with a Numerical Aperture (N.A.) of 0.65±2, emits the light beam having a wavelength of approximately 660 nm with a recording linear velocity set to 20 m/sec to 42 m/sec, is set to 1 for 3T to 5T, 2 for 6T to 8T, 3 for 9T to 11T, and 4 for 14T.

11. The phase change type optical recording medium as claimed in claim 9, wherein said phase change recording layer receives the light beam formed by the single recording pulse and is added with a preheating pulse before the single recording pulse.

12. The phase change type optical recording medium as claimed in claim 11, which has a reflectively greater than or equal to 15% and a modulation factor greater than or equal to 0.4 at the time of a reproduction when recording conditions are such that said preheating pulse has an irradiation time which is greater than or equal to one channel period and is less than or equal to two channel periods, and a power which takes an intermediate value between a recording power and an erasing power of the single recording pulse when recording an EFM mark length of 3T by said single recording pulse.

13. The phase change type optical recording medium as claimed in claim 9, which has a reflectively greater than or equal to 15% and a modulation factor greater than or equal to 0.4 at the time of a reproduction when recording conditions are such that:
said mark length modulation is an Eight-to-Fourteen Modulation (EFM) Plus modulation (EFM+ modulation),
the number of recording pulses received by said phase change recording layer for forming EFM mark lengths of 3T to 14T using an optical system which has a pickup with a Numerical Aperture (N.A.) of 0.65±2, emits the light beam having a wavelength of approximately 660 nm with a recording linear velocity set to 20 m/sec to 42 m/sec, is set to 1 for 3T to 5T, 2 for 6T to 8T, 3 for 9T to 11T, and 4 for 14T, and said phase change recording layer receives the light beam formed by the single recording pulse and is added with a preheating pulse before the single recording pulse, wherein said preheating pulse has an irradiation time which is greater than or equal to one channel period and is less than or equal to two channel periods, and a power which takes an intermediate value between a recording power and an erasing power of the single recording pulse when recording an EFM mark length of 3T by said single recording pulse.

* * * * *